Patented Dec. 19, 1939

2,183,853

UNITED STATES PATENT OFFICE 2,183,853

POLYOXYALKYLENE ETHER ACID COMPOUNDS CONTAINING A HIGHER ALIPHATIC GROUP

Hans Haussmann, Mannheim, and Walter Scheufler and Josef Kaupp, Ludwigshafen-on-the-Rhine, Germany, assignors to I. G. Farbenindustrie Aktiengesellschaft, Frankfort-on-the-Main, Germany No Drawing. Application December 18, 1935, Serial No. 55,062. In Germany December 22, 1934

8 Claims. (Cl. 260—404)

The present invention relates to polyoxyalkylenecarboxylic acids containing at least one high molecular organic radicle suitable as assistants in the textile and related industries and a process of producing same.

We have found that polyoxyalkylenecarboxylic acids, i. e. ether carbocyclic acids having at least two oxygen atoms combined in an ether-like manner, which contain in the molecule at least one organic radicle, i. e. an aliphatic, cycloaliphatic or mixed aromatic-aliphatic radicle of high molecular weight containing more than eight carbon atoms combined by means of a bridge comprising a hetero atom such as an oxygen, nitrogen or sulphur atom or carboxylic acid or carboxylic amide groups, constitute excellent washing, wetting, emulsifying, softening and like agents or assistants for the dye industry. In spite of the solubilising carboxyl groups which per se, are very sensitive to calcium, the products are very stable in hard water. For example while alkali metal salts of lauric acid cannot be employed as capillary-active substances in hard water by reason of the formation of calcium soaps, and while the sodium salt of dodecyl-hydroxyacetic acid ether having the formula

$$C_{12}H_{23}-O-CH_2-COONa$$

is entirely converted into the insoluble calcium salt under the same conditions, for example polyether carboxylic acids of the general formula:

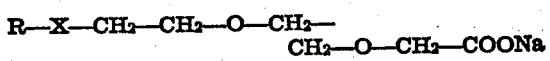
$$R-X-CH_2-CH_2-O-CH_2-\\CH_2-O-CH_2-COONa$$

(in which R is an aliphatic, cycloaliphatic or mixed aromaticaliphatic radicle of high molecular weight containing more than eight carbon atoms, X is any ester or amide group or an ether-like oxygen or sulphur atom or a nitrogen atom, the number of —CH₂— groups between two ether linkages or between an ether linkage and an ester or amide group generally speaking being not more than four) are, contrary to expectation, quite stable to water of the usual hardness. The hetero atoms or atomic groups in the said polyether carboxylic acids or their substitution products may have any desired sequence; compounds of the said kind which are interrupted by further hetero atoms or atomic groups are also suitable.

For example the compounds having the following formulae may be mentioned:

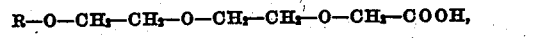
R—O—CH₂—CH₂—O—CH₂—CH₂—O—CH₂—COOH,

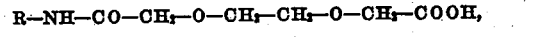
R—NH—CO—CH₂—O—CH₂—CH₂—O—CH₂—COOH,

R—CO—NH—CH₂—CH₂—O—CH₂—CH₂—O—CH₂—COOH,

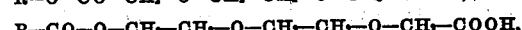
R—O—CO—CH₂—O—CH₂—CH₂—O—CH₂—COOH,

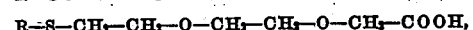
R—CO—O—CH₂—CH₂—O—CH₂—CH₂—O—CH₂—COOH,

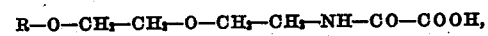
R—S—CH₂—CH₂—O—CH₂—CH₂—O—CH₂—COOH,

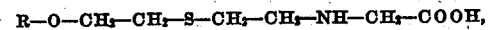
R—O—CH₂—CH₂—O—CH₂—CH₂—NH—CO—COOH,

R—O—CH₂—CH₂—S—CH₂—CH₂—NH—CH₂—COOH,

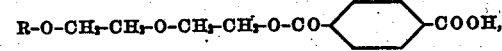
R—O—CH₂—CH₂—O—CH₂—CH₂—O—CO—⟨ ⟩—COOH,

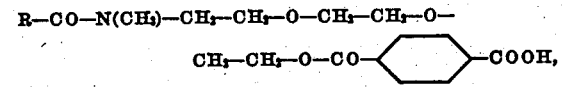
R—CO—N(CH₃)—CH₂—CH₂—O—CH₂—CH₂—O—
CH₂—CH₂—O—CO—⟨ ⟩—COOH,

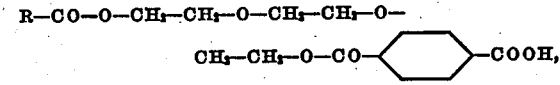
R—CO—O—CH₂—CH₂—O—CH₂—CH₂—O—
CH₂—CH₂—O—CO—⟨ ⟩—COOH,

R—O—CH₂—CO—O—CH₂—CH₂—O—CH₂—CH₂—O—
CH₂—CH₂—O—CO—⟨ ⟩—COOH and

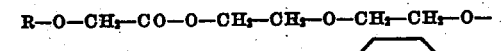
R—O—CH₂—CO—NH—CH₂—CH₂—O—CH₂—CH₂—NH—CO—COOH.

The ether radicle may also be present in side chains of the molecule, for example condensation products of glycocoll and higher fatty acids which are hydroxyethylated on the nitrogen atom and having the formula:

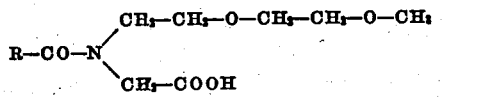
$$R-CO-N\begin{Bmatrix}CH_2-CH_2-O-CH_2-CH_2-O-CH_3\\ CH_2-COOH\end{Bmatrix}$$

and products having the formula:

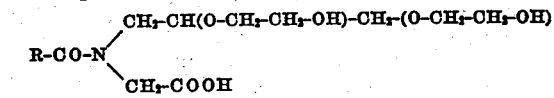
$$R-CO-N\begin{Bmatrix}CH_2-CH(O-CH_2-CH_2-OH)-CH_2-(O-CH_2-CH_2-OH)\\ CH_2-COOH\end{Bmatrix}$$

are suitable.

The preparation of the said polyoxyalkylenecarboxylic acids may be carried out in different ways. For example alkyl or like radicles of high molecular weight may be introduced into polyoxyalkylenecarboxylic acids, when free hydroxyl or amino groups are present in the same, by reacting them with carboxylic acids or alcohols of high molecular weight. The poly-ethers may be prepared by polymerisation of low molecular poly-hydric aliphatic alcohols, such as ethylene glycol, glycerine, glycide and the like or by condensing high molecular alcohols or amines with alkylene oxides, preferably with ethylene oxide.

Carboxylic acid groups may also be introduced into poly-ethers which already contain alkyl or like groups of high molecular weight. For example polyethers which already contain an alkyl or like group of high molecular weight and which also have a mineral acid radicle combined in an ether-like manner, may be caused to react with hydrocyanic acid or its salts, the resulting nitriles being saponified. Furthermore polyethers having alkyl or like radicles of high molecular weight and free terminal —$CH_2OH$— groups may be converted into carboxylic acids of the desired kind by oxidation or by way of the alcoholate by reaction with halogen carboxylic acids. Carboxylic groups may be introduced into polyethers of the said kind containing free amino groups by reacting with mineral acid esters of hydroxycarboxylic acids; by reaction with dicarboxylic or polycarboxylic acids, such as maleic acid, adipic acid or phthalic acid, the corresponding amide acids are obtained therefrom.

The products obtainable according to this invention constitute excellent washing and emulsifying agents and are suitable for washing even in the case of dirt or stains which could only be unsatisfactorily removed by washing agents hitherto known. Furthermore they are quite generally suitable as excellent wetting agents and assistants in the dye industry. For use in acid baths may be mentioned especially products containing a large number of ether radicles, while the products containing alkyl radicles of high molecular weight and having a small number of ether radicles are especially suitable as softening agents.

Those products which contain in the molecule not only an alkyl radicle of high molecular weight but also ether radicles of low molecular weight, as for example methyl, ethyl, propyl, benzyl or glycol ether radicles or radicles of other polyhydric alcohols of low molecular weight, are especially suitable as washing and like agents. Products of this kind are for example the diethyleneglycol-α-dodecyl ether-ω-N-methyl amino-acetic acid, or diethylene glycol α-octodecyl ether-ω-N-benzyl mono maleic acid amide.

The following examples will further illustrate the nature of this invention but the invention is not restricted to these examples. The parts are by weight.

*Example 1*

2.4 parts of sodium are gradually introduced while stirring into 96 parts of dodecyl-triethylene glycol ether at a temperature of from 140° to 160° C. When all the sodium has been dissolved, 12 parts of sodium monochloracetate are added to the hot solution and the mixture within which common salt commences to separate is heated for about five hours while stirring at 180° to 200° C. until the reaction is completed. The reaction product is then taken up in water, the excess of dodecyltriethylene glycol removed by extraction with ether and the aqueous solution evaporated to dryness. After drying in vacuo, a product is obtained which dissolves in water giving a clear solution while foaming strongly, it has excellent washing and wetting power and is not sensitive to the substances forming the hardness in water.

*Example 2*

4.8 parts of sodium are gradually introduced while stirring at a temperature of 160° to 180° C. into 200 parts of hydroxyethylated octodecyl alcohol (obtainable by adding 4 molecular proportions of ethylene oxide onto 1 molecular proportion of octodecyl alcohol). When all the sodium has passed into solution, 22 parts of sodium monochloracetate are added to the hot solution and the whole is heated for about five hours at 200° C. while stirring. While the reaction product is still in the liquid state, it is shaken vigorously with hot water. The aqueous solution is separated from the oil consisting mainly of excess hydroxyethylated octodecyl alcohol and evaporated to dryness first on a waterbath and then in vacuo. A pale brown product is obtained which dissolves readily in water with strong formation of foam and which has a high wetting and washing power.

If artificial silk be treated with a solution of the product, hydro-extracted and dried, a material having a more agreeable touch is obtained.

*Example 3*

16 parts of bis-ethylene glycolic acid anhydride (obtained from the acid by heating with acetic anhydride) are heated to boiling for from two to three hours in alcoholic solution with 27 parts of oleylamine. After cooling, the solution is neutralised with caustic soda and freed from small amounts of impurities by extraction with ether. By evaporating the neutral solution a product is obtained having a good foaming and wetting power and a very great stability to the substances forming the hardness of water.

Other amines of high molecular weight, such as dodecylamine or octadecylamine, or secondary bases, such as octadecylmethylamine or oleylmethylamine, furthermore abietinyl amine, may be employed instead of oleylamine.

*Example 4*

16 parts of the bis-ethylene glycolic acid anhydride specified in Example 3 are fused with 19 parts of dodecyl alcohol and kept at 100° C. for some time. The reaction mixture is dissolved in alcohol and neutralised with caustic soda solution. After evaporating the solution, there remains a product, of good solubility in water, which has great stability to hardness in water. Other saturated or unsaturated fatty alcohols may be employed in the same manner.

*Example 5*

70 parts of nitric acid (specific gravity 1.4) are heated to 80° C. and 35 parts of dodecyl triglycol ether are slowly introduced while stirring. When the oxidation is completed, the whole is evaporated to dryness and the residue taken up with alcohol and neutralised. Non-acid constituents are removed by extraction with ether and the product is again evaporated and the dodecyl polyether carboxylic acid sodium salt is freed from any by-products formed by boiling with alcohol. It dissolves in water giving a clear solution and has great foaming power and good stability to calcium salts.

The acid $$C_{12}H_{37}-O-C_2H_4-O-C_2H_4-O-CH_2-COOH$$

may be obtained in an analogous manner by the oxidation of octadecyl triglycol ether. The properties of its sodium salt are similar to those of the product prepared from dodecyl triglycol ether.

Example 6

Diglycol monoethyl ether is converted into the corresponding sulphuric ester and the latter caused to react in aqueous solution with sodium glycocoll. The resulting substituted glycocoll is condensed with oleic acid chloride according to the Schotten-Baumann reaction, a product having excellent wetting, dispersing and like power being obtained.

Instead of oleic acid chloride also chlorides of other high molecular carboxylic acids, such as naphthenic acids, abietic acid or phenyl-stearic acid may be employed. In this case substances having a good wetting power are obtained.

Example 7

45 parts of octodecyl triethylene glycol chlormethyl ether (obtainable in known manner from octodecyl triethylene glycol with trioxymethylene and hydrochloric acid) are heated with 10 parts of cuprous cyanide for from five to six hours at from 120° to 130° C., while stirring. After cooling, the product is taken up in ether and filtered. The ethereal solution, when evaporated, leaves behind 45 parts of a nitrile which is readily saponified by boiling with alcoholic caustic potash. The resulting potassium salt of the carboxylic acid corresponding to the above nitrile has great stability to the substances forming the hardness of water and has a very good washing power.

Example 8

287 parts of an amine having the formula:

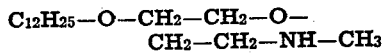
$$C_{12}H_{25}-O-CH_2-CH_2-O-CH_2-CH_2-NH-CH_3$$

(obtainable by the reaction of the sulphuric ester of diethylene glycol monododecyl ether with methylamine) are heated to boiling in alcoholic solution with 148 parts of phthalic anhydride for some hours. After cooling, the product is neutralised with caustic soda solution and evaporated to dryness. The carboxylic acid of high molecular weight thus obtained in the form of its sodium salt is a good washing agent for washing white goods and it has a high stability to calcium salts.

In order to prepare the amine employed as initial material, there may be employed instead of the sulphuric ester of diethylene glycol monododecyl ether, other polyethers of fatty alcohols; furthermore the phthalic acid may be replaced by other dicarboxylic acids, as for example succinic acid or tartaric acid.

Example 9

274 parts of diethylene glycol monododecyl ether are fused with 148 parts of phthalic anhydride for from two to three hours at from 140° to 150° C. The cooled melt is dissolved in alcohol and neutralised with caustic soda solution. After evaporating the alcohol, the sodium salt of the carboxylic acid is obtained in the form of a paste which is dissolved in water to give a clear solution. Its aqueous solutions have a high foaming power and an excellent stability to the substances forming the hardness of water. In particular it has a very good washing power for white goods.

What we claim is:

1. As assistant in the textile and related industries the triethyleneglycol-α-dodecyl ether ω-acetic acid.

2. As assistant in the textile and related industries the bis-ethylene glycolic acid mono oleyl amide.

3. As assistant in the textile and related industries the diethylene glycol-α-dodecylether-ω-mono maleic acid ester.

4. As assistants in the textile and related industries a compound corresponding to the formula R—X—Y, in which R is a high molecular organic radicle selected from the class consisting of aliphatic, cycloaliphatic and mixed aromatic-aliphatic radicles with more than 8 carbon atoms, X is a polyoxyalkylene group being derived from low molecular polyhydric alcohols and Y means a low molecular aliphatic radicle containing at least one unaltered carboxyl group.

5. As assistants in the textile and related industries a compound corresponding to the formula R—X—Y, in which R is a high molecular organic radicle selected from the class consisting of aliphatic, cycloaliphatic and mixed aromatic-aliphatic radicles with more than 8 carbon atoms, X is a polyoxyalkylene group being derived from low molecular polyhydric alcohols and Y means a low molecular aliphatic radicle containing at least one unaltered carboxyl group the radicle R being attached to the polyoxyalkylene radicle by means of a hetero atom.

6. As assistants in the textile and related industries a compound corresponding to the formula R—X—Y, in which R is an aliphatic radicle with more than 8 carbon atoms, X is a polyoxyalkylene group being derived from low molecular polyhydric alcohols and Y means a low molecular aliphatic radicle containing at least one unaltered carboxyl group the radicle R being attached to the polyoxyalkylene radicle by means of a hetero atom.

7. As assistants in the textile and related industries a compound corresponding to the formula R—X—Y, in which R is an aliphatic radicle with more than 8 carbon atoms, X is a polyoxyalkylene group being derived from low molecular polyhydric alcohols and Y means a low molecular aliphatic radicle containing at least one unaltered carboxyl group the radicle R being attached to the polyoxyalkylene radicle by means of a carboxylic amide group.

8. As assistants in the textile and related industries a compound corresponding to the formula R—X—Y, in which R is an aliphatic radicle with more than 8 carbon atoms, X is a polyoxyalkylene group being derived from low molecular polyhydric alcohols and Y means a low molecular aliphatic radicle containing at least one unaltered carboxyl group the radicle R being attached to the polyoxyalkylene radicle by means of an oxygen atom.

HANS HAUSSMANN.
WALTER SCHEUFLER.
JOSEF KAUPP.